United States Patent [19]
Sawtell

[11] Patent Number: 5,949,225
[45] Date of Patent: Sep. 7, 1999

[54] ADJUSTABLE FEEDBACK CIRCUIT FOR ADAPTIVE OPTO DRIVES

[75] Inventor: Carl Keith Sawtell, San Jose, Calif.

[73] Assignee: Astec International Limited, The Hong Kong Special Administrative Region of the People's Republic of China

[21] Appl. No.: 09/044,606

[22] Filed: Mar. 19, 1998

[51] Int. Cl.$^6$ .................................................. G05F 1/40
[52] U.S. Cl. ......................................... 323/284; 323/902
[58] Field of Search ................................. 323/274, 278, 323/284, 902

[56] References Cited

U.S. PATENT DOCUMENTS

| 4,267,502 | 5/1981 | Reese et al. | 323/237 |
| 4,574,249 | 3/1986 | Williams | 330/59 |

*Primary Examiner*—Shawn Riley
*Attorney, Agent, or Firm*—Coudert Brothers

[57] ABSTRACT

In an electronic circuit having an input stage, an output stage having an output voltage, and a feedback element including a coupler having a transmitter coupled to said output stage and a receiver coupled to said input stage, said receiver being galvanically isolated from said transmitter, said transmitter sending an output signal that is a function of said output voltage to said receiver, said receiver generating a receiver output in response to receiving said output signal, a feedback control circuit for said feedback element, said feedback control circuit comprising: a transmitter drive circuit coupled to said transmitter for adjusting said output signal as a function of said output voltage, said transmitter drive circuit comprising an error signal generation stage, said error signal generation stage using a voltage that is a function of the output voltage to generate a feedback control signal, and a non-linear stage, said non-linear stage outputting a transmitter drive signal to said transmitter as a function of said feedback control signal, wherein said non-linear stage non-linearly adjusts said transmitter drive signal as a function of said output voltage to compensate for variations in the ratio of said receiver output to said transmitter drive signal; and a receiver output circuit, said receiver output circuit receiving and amplifying said receiver output and coupling said amplified output to said input stage and causing said receiver to operate at a substantially fixed bias operating current.

In a preferred embodiment, the non-linear stage is an exponential transconductance stage for exponentially adjusting the transmitter drive signal, said coupler comprises an optocoupler having a light emitting diode (LED) as said transmitter and a phototransistor as said receiver, said phototransistor being optically coupled to said LED, said LED having an anode and a cathode and said phototransistor having an emitter terminal and a collector terminal.

17 Claims, 4 Drawing Sheets

ADJUSTABLE FEEDBACK CIRCUIT FOR ADAPTIVE OPTO DRIVES

BACKGROUND OF THE INVENTION

1. Field of the Invention

The present invention generally relates to the use of couplers as a means for generating a feedback signal in an input circuit that is galvanically isolated from an output circuit, and more particularly to non-linearly adjusting the output of the transmitter in the coupler to compensate for variations in the gain of the coupler.

2. Description of the Art

Power supplies for converting an input AC or DC power source into one or more regulated output voltages, which are coupled to associated loads, typically comprise a power stage and a feedback loop between the input and output stages of the power stage. The feedback loop controls the power stage so that it compensates for fluctuations in the load in order to deliver a constant amplitude output voltage. Such AC to DC or DC to DC converter circuits typically require separate ground references for the primary and secondary sides (i.e., the input and output stages) of the power supply circuit so that they are galvanically isolated from each other. This requires that an isolation barrier be created which prevents any electrical connection between the load being powered by the DC output of the power supply and the power supply's input power source.

Galvanic isolation is typically accomplished by use of a transformer connected between the primary and secondary sides of the power stage of a power supply. The DC to DC converter works by converting the input DC input to an alternating current. The transformer functions to convert the alternating current in a primary winding to an alternating magnetic field and then back to an alternating current in a secondary winding. This secondary current is then rectified to achieve a DC output. The primary and secondary sides of the power supply are thus separated by an "isolation barrier" across which no direct current is allowed to flow.

With the power stage including such an isolation barrier, it is also necessary to galvanically isolate the primary and secondary sides of the feedback loop such that the feedback signal is also coupled across an isolation barrier from the secondary side back to the primary side. Optocouplers are commonly used for this purpose. Optocouplers consist of a light-emitting diode (LED) and a corresponding photodiode (or phototransistor), and are typically integrated in a single dual in-line plastic package. The LED is connected to the secondary side of the power supply and the photodiode is connected to the primary side to enable coupling of the feedback control signal back to the primary side. A current flowing in the LED, typically made of gallium arsenide (GaAs), results in the emission of photons of infrared light. The photodiode is typically a silicon based semiconductor which is designed to be especially receptive to infrared light. The photodiode is positioned with respect to the LED to maximize the number of photons that reach the active area of the photodiode. The photons received by the photodiode generate electron carriers within the semiconductor, resulting in a leakage current proportional to, but having a current that is several orders of magnitude less than, the LED drive current. To amplify this current to a more useable value, it is common practice to use a phototransistor (i.e., where the collector-base junction of an npn transistor is the photodiode). As such, the leakage or photocurrent ($I_D$) of the photodiode serves as a base current ($I_B$) for the bipolar transistor ($I_B=I_D$). The inherent current gain (beta=$I_C/I_B$) of the transistor, typically on the order of several hundred to above 10,000 for Darlington transistors, causes the collector current ($I_C$) to be of a magnitude comparable to the current flowing in the LED ($I_{LED}$) The ratio between the collector current and the LED drive current is referred to as the current transfer ratio (CTR=$I_C/I_{LED}$) of the optocoupler.

Ideally, the CTR should be unity in order to provide a stable feedback signal. However, there are several inherent characteristics of optocouplers that affect their performance and CTRs. First, the CTR is not predictable due to variations in the fabrication and packaging of optocouplers. For example, normal tolerances in the processing of silicon semiconductors will produce phototransistors having a beta that varies over a 4 to 1 range. In addition, the emissivity of LEDs varies considerably within normal semiconductor processing tolerances. Variations in the mounting and packaging of the LED and phototransistor affects an optocoupler's CTR in several ways. Typically, the LED and photodiode of an optocoupler are mounted facing each other on separate metal leadframes and sealed in an optically transparent plastic. The properties of the plastic are optimized to withstand very intense electric fields. This optically transparent plastic is sometimes coated with a reflective coating to further increase the amount of light directed at the photodiode. The assembly is then encapsulated in a layer of opaque plastic which is optimized for its ability to protect the semiconductors inside from moisture and contamination. Thus, variations in the transparency of the inner plastic and the reflectivity of the interface between the two plastics can vary the number of photons received by the photodiode thus affecting the CTR. Additionally, the distance between the LED and the photodiode can effect the CTR, as well as the incidence angle at which the photons from the LED impinge upon the photodiode.

Another inherent characteristic that effects the performance of the optocoupler is the large junction area of the photodiode. This large junction area creates a parasitic capacitance between the base and emitter junctions of the phototransistor comprising the photodiode. This limits the bandwidth of the feedback signal being coupled through the optocoupler. That is, the gain of the phototransistor rolls off at higher frequencies.

A third inherent problem with optocouplers is that their gain is nonlinear. This not only limits the useful range of the coupler, but also causes the small signal AC gain to be higher than the DC gain, further adding to the unpredictability of the CTR.

Finally, the CTR decreases with age. This is due primarily to a reduction in the emissivity of the LED and to a degradation over time, particularly at high temperatures, in the optical properties of the transparent plastic separating the LED and the photodiode.

To compensate for these characteristic deficiencies in optocoupler performance, prior art circuits have been developed that attempt to improve on the portion of the feedback circuit which drives the LED. More specifically, they attempt to provide an LED drive circuit that has a gain independently controllable from that of the optocoupler. An example of such a circuit, illustrated in FIG. 2, is the Unitrode UC39431 opto driver, which employs an amplifier which feeds a control voltage to a voltage-to-current converter. The voltage-to-current converter converts the control voltage to a ground-referenced current signal which is a linear function of the control voltage and which determines the LED current. With this arrangement, the gain of the LED drive circuit is controlled independently of the optocoupler gain. However, as the current signal which determines the LED current is a linear function of the control voltage, the LED current is varied linearly with respect to the control voltage. The linear variation of the LED current does not compensate for variations in the optocoupler gain in a way that maintains the gain of the overall circuit substantially constant, i.e., substantially independent of the optocoupler's gain. Therefore, the gain of the overall circuit still varies with variations in the gain of the optocoupler despite the linear adjustment of the LED current.

Therefore, there is a need for an adjustable gain block within the drive portion of the optocoupler circuit that compensates for the unpredictable gain fluctuations of the optocoupler, as well as for thermal drift and aging of the circuit, such that the gain of the overall circuit remains constant despite variations in the gain of the optocoupler.

SUMMARY OF THE INVENTION

The inventor of the present invention has discovered that varying the LED.

The aforementioned and related drawbacks associated with conventional optocoupler feedback circuits are eliminated or substantially reduced by the present invention. The present invention calls for varying an LED drive signal in a non-linear and, preferably, exponential fashion with respect to a feedback control signal, which is a function of a load voltage, to minimize the effects of an optocoupler's gain on the feedback loop.

The present invention provides a feedback loop that is independent of optocoupler gain variations (variations in CTR), thereby enabling improved power supply performance, as the feedback loop can be better optimized, as well as enabling a relaxation of the required specifications for the optocoupler and other component tolerances, thereby reducing circuit costs. The present invention takes advantage of the fact that, by forcing the phototransistor output of an optocoupler to an operating point that is at a fixed known current, the gain of the optocoupler can be inferred from the required drive current for the LED, since the feedback loop forces the LED drive current to be equal to the phototransistor operating current divided by the CTR (gain) value of the optocoupler. The gain of the circuit that drives the optocoupler's LED can then be controlled to compensate for variations in the CTR. The gain of this variable gain element is adjusted, according to the present invention, to be substantially proportional to the inverse of the small signal CTR to compensate for variations in the CTR, thereby enabling the overall gain of the optocoupler and the LED drive circuit to remain at a substantially constant (ideal) value. The result is a system that compensates for unwanted variations in an optocoupler's gain, whether the unwanted variations are caused by thermal drift, aging or any other source.

Broadly stated, the present invention comprises a feedback control circuit for a feedback element in an electronic circuit. The electronic circuit includes both an input stage and an output stage, where the output stage has an associated output voltage. In a preferred embodiment, the feedback element is positioned between the output stage and the input stage. The feedback element comprises an optocoupler having a light emitting diode (LED) optically coupled to a phototransistor. The LED is also coupled to the output stage of the feedback element with the phototransistor being coupled to the input stage of the feedback element. The gain of the optocoupler is substantially equal to the ratio of the emitter current of the phototransistor to the current through the LED. An LED drive circuit is coupled to the LED and includes a drive circuit input stage for receiving the output voltage of the output stage. The drive circuit input stage provides an input signal that is a function of the output voltage. The LED drive circuit also includes an error generation stage coupled to the drive circuit input stage for generating a feedback control signal that is a function of the input signal, and an exponential stage which is coupled to the error signal generation stage for generating an LED drive signal and for coupling the LED drive signal to the LED. In operation, the exponential stage exponentially adjusts the LED drive signal as a function of the feedback control signal to compensate for variations in the gain of the optocoupler. The feedback element also includes a phototransistor output circuit coupled to the emitter of the phototransistor and the input stage. The phototransistor output circuit amplifies the emitter current, thereby coupling the amplified emitter current to the input stage, and causing the phototransistor to operate at a substantially predetermined bias operating current.

It is a further object of the present invention to provide an optocoupler feedback control circuit which compensates for thermal drift and for aging of the optocoupler.

Still another object of the present invention is to provide an optocoupler feedback control circuit which provides a feedback control signal having a gain which is adjustable independent of the gain of the optocoupler.

These and other objects and advantages of the present invention will become more apparent from the following detailed description and the accompanying drawings.

DETAILED DESCRIPTION OF THE DRAWINGS

Figure 1:
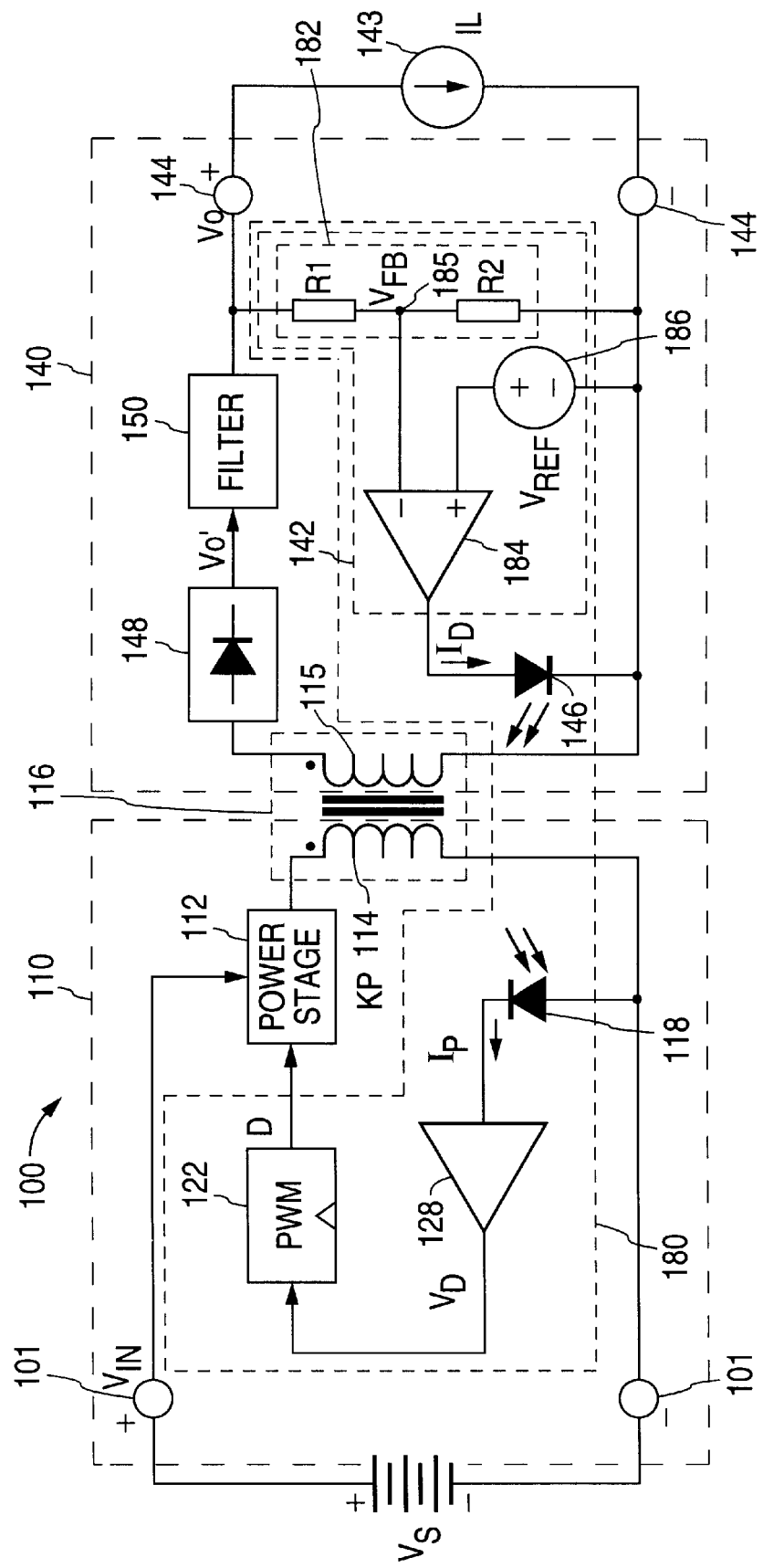
FIG. 1 is a block diagram of a power supply having a feedback circuit which utilizes a prior art optocoupler circuit.

Referring to the drawings, FIG. 1 is a block diagram of a prior art power converter which utilizes a conventional feedback loop optocoupler for coupling a feedback signal across an isolation barrier. Power converter 100 is coupled to a source of power $V_S$ which supplies an input voltage $V_{IN}$ at input nodes 101 of power converter 100. Power converter 100 comprises primary stage 110 and secondary stage 140, which are galvanically isolated from one another (i.e., all DC circuit paths between them have been eliminated) and collectively contain feedback circuit 180. The galvanic isolation between primary stage 110 and secondary stage 140 is provided by a transformer and an optocoupler, described below. Primary stage 110 is coupled to input nodes 101 and includes power stage 112, a pulse width modulator (PWM) 122, and primary winding 114 of transformer 116. Primary stage 110 also includes photodiode 118, which is part of feedback circuit 180 of power converter 100. Secondary stage 140 is coupled to load 143 at output terminals 144 and includes secondary winding 115, rectifier stage 148 and filter 150. Secondary stage 140 also includes LED control circuit (LED drive circuit) 142 and a light emitting diode (LED) 146, all of which are part of feedback circuit 180, which is described in further detail below. Feedback circuit 180 includes LED drive circuit 142, LED 146 coupled to LED drive circuit 142, photodiode 118 galvanically isolated from LED 146 but optically coupled thereto, amplifier 128 and pulse width modulator 122. LED drive circuit 142 includes voltage divider 182, which contains resistors R1 and R2 coupled to load 143, and error amplifier 184, whose inverting terminal is coupled to node 185 between resistors R1 and R2 and whose non-inverting terminal is coupled to reference voltage source 186.

Power source $V_S$ supplies power to power converter 100 at input nodes 101 coupled to primary stage 110. Power stage 112, which is coupled to one of the input nodes 101 and primary winding 114 of transformer 116, generates an AC signal and couples it to transformer 116, thus controlling the transfer of power from power source Vs to transformer 116. Power from transformer 116 is then transferred to secondary winding 115. The AC signal transferred to secondary winding 115 is then converted back to a DC signal by means of rectifier 148 coupled to one of the terminals of secondary winding 115. The rectified DC voltage $V_{O'}$ is then coupled to the input of filter 150, which filters $V_{O'}$ and outputs a voltage $V_O$ to load 143 at output terminals 144. Thus, input voltage $V_{IN}$ from power source $V_S$ is transferred to load 143 as output voltage $V_O$.

Feedback circuit 180 is provided between $V_O$ and power stage 112 to control power stage 112 to compensate for fluctuations in $V_O$. $V_O$ is divided down through a voltage divider circuit 182 comprising resistors R1 and R2. The output of voltage divider circuit 182 is a feedback signal $V_{FB}$ which is provided as an input to the inverting terminal of error amplifier 184. A reference voltage supply 186 provides a reference voltage $V_{REF}$ to the non-inverting input of error amplifier 184. The output of error amplifier 184 is coupled to LED 146. The current $I_D$ through LED 146 results in the emission of photons of infrared light. Photodiode 118 is typically a silicon-based semiconductor which is especially receptive to infrared light. The photons received by photodiode 182 generate electron carriers, resulting in a leakage or photocurrent $I_P$ that is proportional to, but several orders of magnitude less than $I_D$. LED 146 and photodiode 118 constitute an optocoupler and are preferably integrated together in a dual in-line package (DIP) as an optocoupler circuit. Also, included in the optocoupler circuit is an amplifier 128 coupled to the output of photodiode 118. Amplifier 128 amplifies $I_P$ and generates control signal $V_D$, which is coupled to PWM 122. As mentioned above, amplification of $I_P$ can also be achieved by using a phototransistor in place of photodiode 118. PWM 122 produces a digital pulse train which drives power stage 112. The width of pulses produced by PWM 122 decreases or increases as output voltage $V_O$ drifts above and below a set value, respectively. As the width of pulses is decreased, less power is transferred from primary stage 110 to secondary stage 140. Conversely, as the width of pulses is increased, more power is transferred from primary stage 110 to secondary stage 140.

Basically, the operation of the feedback loop can be summarized as follows: as $V_O$ deviates from its ideal value as a result of variations in the load 143, $V_{FB}$ differs from the reference voltage, and error amplifier 184 produces a control signal which forces power stage 112 to compensate for deviations in $V_O$.

Figure 2:
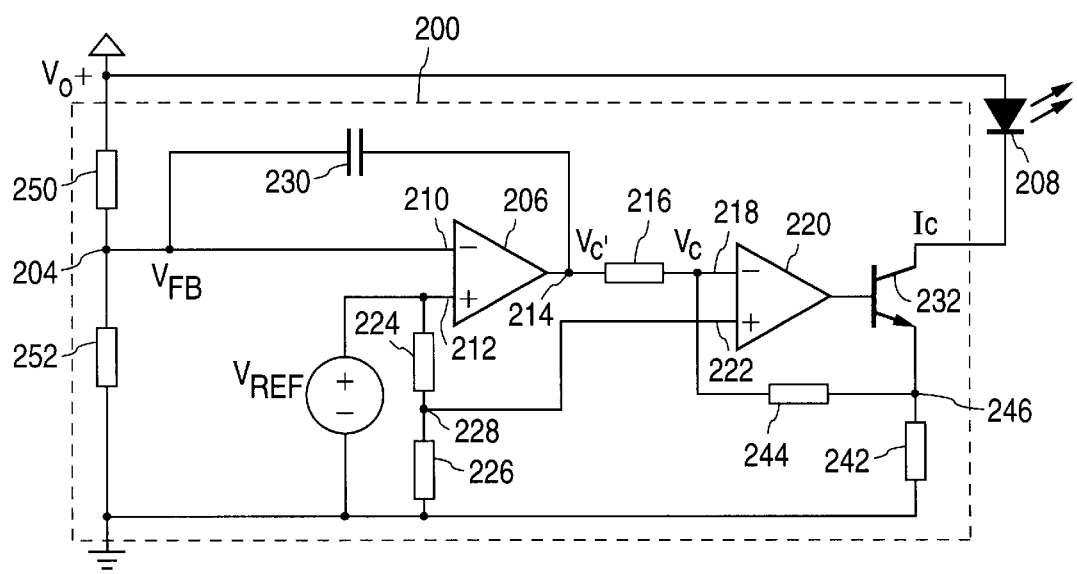
FIG. 2 is schematic diagram of a prior art optocoupler LED drive circuit.

FIG. 2 shows a prior art LED drive circuit 200 (produced by Unitrode as model number UC 39431). LED drive circuit 200 is intended to provide a gain that is independently controllable from that of the optocoupler. LED drive circuit 200 includes a voltage divider network comprising resistors 250 and 252 coupled in series between $V_O$ and ground. $V_O$ is the voltage that is output to a load by the power supply, as described with reference to FIG. 1. The voltage divider serves to provide, at node 204, a voltage feedback signal $V_{FB}$, whose magnitude is less than that of output voltage $V_O$. An LED 208 is coupled between $V_O$ and the output of LED drive circuit 200.

LED drive circuit 200 also includes a first operational amplifier 206 having an inverting input 210 coupled to node 204 and a non-inverting input 212 coupled to a reference voltage $V_{REF}$. First operational amplifier 206 functions as an error signal generator which generates an error signal that is a measure of the deviation of the output voltage from a desired point. The output voltage of amplifier 206, shown as $V_C$, at node 214, is fed through a resistor 216 to the inverting input 218 of a second operational amplifier 220. A feedback capacitor 230 is coupled between the output 214 and the inverting input 210 of operational amplifier 206. The non-inverting input 222 of operational amplifier 220 is coupled to a node 228 at the output of a second voltage divider network comprising resistors 224 and 226 coupled between the output of the $V_{REF}$ voltage source and ground. The output of operational amplifier 220 is coupled to the base terminal of an npn transistor 232 whose collector terminal is coupled to the cathode terminal of LED 208. A resistor 242 is coupled in series between the emitter of transistor 232 and ground. A feedback resistor 244 is coupled between inverting input 218 of amplifier 220 and node 246, located between resistor 242 and the emitter of transistor 232.

The first operational amplifier 206 and feedback capacitor 230 function as an integrator having a time-dependent gain responsive to fluctuations in $V_{FB}$, to generate voltage control signal $V_C$. $V_C$ is fed through resistor 216, which outputs a voltage $V_C$, in response thereto. Instead of being directly coupled to LED 208, $V_C$ is fed to amplifier 220 which operates as a voltage-to-current converter so as to generate current $I_C$ through transistor 232 and thereby cause a current $I_C$ to flow through LED 208.

The above-described prior art configuration, wherein current $I_C$, rather than voltage $V_C$, is coupled to LED 208, reduces the effect of high frequency disturbances in $V_O$ on the operation of the optocoupler. In addition, use of resistor 244 allows the gain of voltage-to-current converter 220, and thus the gain of the LED drive circuit 200, to be adjusted independently of the gain of the optocoupler. However, since the gain of the optocoupler and the gain of the optocoupler drive circuit are independent, the overall gain of the overall feedback loop varies directly with the CTR of the optocoupler.

By contrast, the present invention provides an adaptive gain optocoupler circuit which provides an LED drive circuit having a variable gain block (1) which is adjustable independently of the optocoupler, and (2) which compensates for the inherent and operational fluctuations in the gain of the optocoupler. This is accomplished by varying the LED current non-linearly, and preferably exponentially, with respect to the control voltage. A description of the feedback control circuit of the present invention is now provided with regard to FIGS. 3 and 4.

Figure 3:
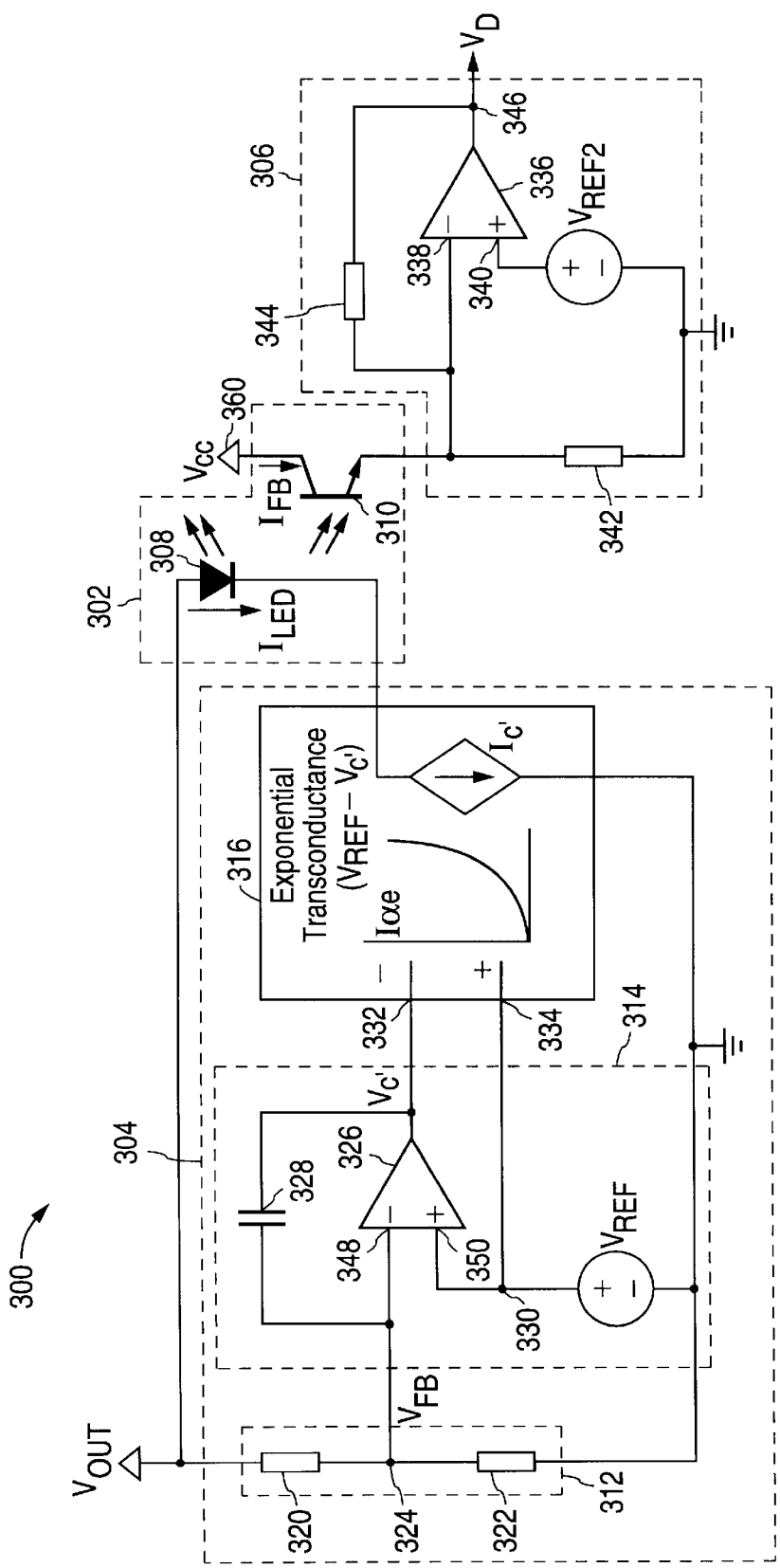
FIG. 3 is a block diagram of an optocoupler feedback control circuit according to the present invention.

FIG. 3 shows a block diagram of the feedback circuit of the present invention. Feedback circuit 300 comprises three basic components: optocoupler 302, LED drive circuit 304, and phototransistor output circuit 306.

Optocoupler 302 includes an LED 308 and a corresponding phototransistor 310. The anode terminal of LED 308 is coupled to output voltage $V_{OUT}$ and the cathode terminal of LED 308 is coupled to the output of LED drive circuit 304. The collector of phototransistor 310 is coupled to an independent source of voltage $V_{CC}$. The emitter terminal of phototransistor 310 is coupled to the input of phototransistor output circuit 306.

LED drive circuit 304 includes a voltage divider stage 312, an amplifier stage (error signal generation stage) 314, and an exponential transconductance stage 316. Voltage divider 312 includes resistors 320 and 322 coupled in series between output voltage output $V_{OUT}$ and ground. The output voltage $V_{FB}$ of voltage divider 312 is coupled at node 324 to the amplifier stage 314. Amplifier stage 314 includes an amplifier 326 having an inverting input 348 coupled to node 324 and a non-inverting input 350 coupled to a voltage reference $V_{REF}$. Amplifier stage 314 provides a voltage control signal (a feedback control signal) $V_C$ to input 332 of exponential transconductance stage 316. Voltage control signal $V_C$ is an error signal whose value is a function of the deviation of the output voltage from a desired reference point. In a preferred embodiment, as shown in FIG. 3, amplifier stage 314 includes a feedback capacitor 328 coupled between the output of amplifier 326 and the inverting input 348 of amplifier 326. Thus, in a preferred embodiment, amplifier stage 326 is an integrator which integrates the voltage difference between $V_{FB}$ and $V_{REF}$. In other embodiments, amplifier stage 314 may include a conventional error amplifier, rather than an integrator. Exponential transconductance stage 316 has a second input 334 coupled to voltage reference $V_{REF}$ at node 330. Exponential transconductance stage 316 functions to convert voltage control signal $V_C$ into an output current signal $I_C$ which drives LED 308. In operation, stage exponential transconductance 316 compares $V_C$ to the fixed voltage reference $V_{REF}$, and creates a current control signal $I_C$ that is exponentially related to differential voltage $V_{REF}-V_C$. This result is represented by the following relationship:

$$I_C = I_{REF} e^{m(V_{REF}-V_C)} \quad (1)$$

where $I_{REF}$ is an arbitrary constant and m is a gain constant. For example, if m=1.38, $I_C$ doubles for each 500 mV change in the control voltage $V_C$ output by amplifier 326. The structural and functional details of exponential transconductance stage 316 are described more fully below.

Phototransistor output circuit 306 includes an amplifier 336 having an inverting input 338 coupled to the output of optocoupler 302 at the emitter of phototransistor 310. Amplifier 336 also has a non-inverting input 340 coupled to a reference voltage $V_{REF2}$. Amplifier 336 and $V_{REF2}$ are available in an integrated circuit package, such as the TL431 (manufactured by Texas Instruments). A resistor 342 is coupled between inverting input 338 and ground. A feedback resistor 344 is coupled between the output 346 of amplifier 336 and inverting input 338. A voltage control signal $V_D$ is generated by amplifier 336 at output 346 and is coupled to a PWM of a power converter, as shown in FIG. 1.

$V_{CC}$ provides a constant operating voltage for phototransistor output circuit 306 which is independent of LED drive circuit 304. $V_{REF2}$ provides DC bias at input 340 of amplifier 336. $V_{REF2}$ is provided at input 340 to enable generation of $V_D$ a voltage having level that is plus or minus a predetermined voltage level set by $V_{REF2}$. Voltage control signal $V_D$ is in part determined by feedback resistor 344. Amplifier 336 will drive feedback resistor 344 so as to maintain the voltage at the inverting input 338 at substantially the same voltage as $V_{REF2}$. The value of feedback resistor 344 is chosen to be large in comparison with resistor 342 such that the current flowing through resistor 342 will be substantially equal to the emitter current in the phototransistor 310. The current in resistor 342 will be set by the voltage across it, which is substantially the same as $V_{REF2}$. This forces $I_{FB}$, the current in the phototransistor, 310 to operate at essentially the same current, differing only by the small amount flowing through feedback resistor 344. The feedback loop will therefore force LED 302 to operate with a current $I_{LED}=I_{FB}/CTR$. The CTR of optocoupler 302 can thus be determined by measuring $I_{LED}$.

Thus, the key to compensating for unwanted variations in the CTR of the optocoupler is to provide an LED drive circuit 304 whose gain is adjusted to provide a gain equal to 1/CTR. In other words, the present invention relies on the fact that the optocoupler is operated at a known condition at its output. Since the phototransistor 310 operating point will be forced by the feedback loop to a substantially predetermined small range of values, the operating point of LED 302 will accurately reflect the value of the CTR of the optocoupler. This information will allow the gain of the overall feedback loop to be adjusted to reflect the present value of the CTR. In order to compensate for overall changes in system gain resulting from variations in CTR, the gain of the LED drive circuit 304 must vary as a function of 1/CTR. This requires that the gain of the optocoupler drive stage and its output current be proportional, which is the characteristic of the exponential transconductance stage 316.

Figure 4:
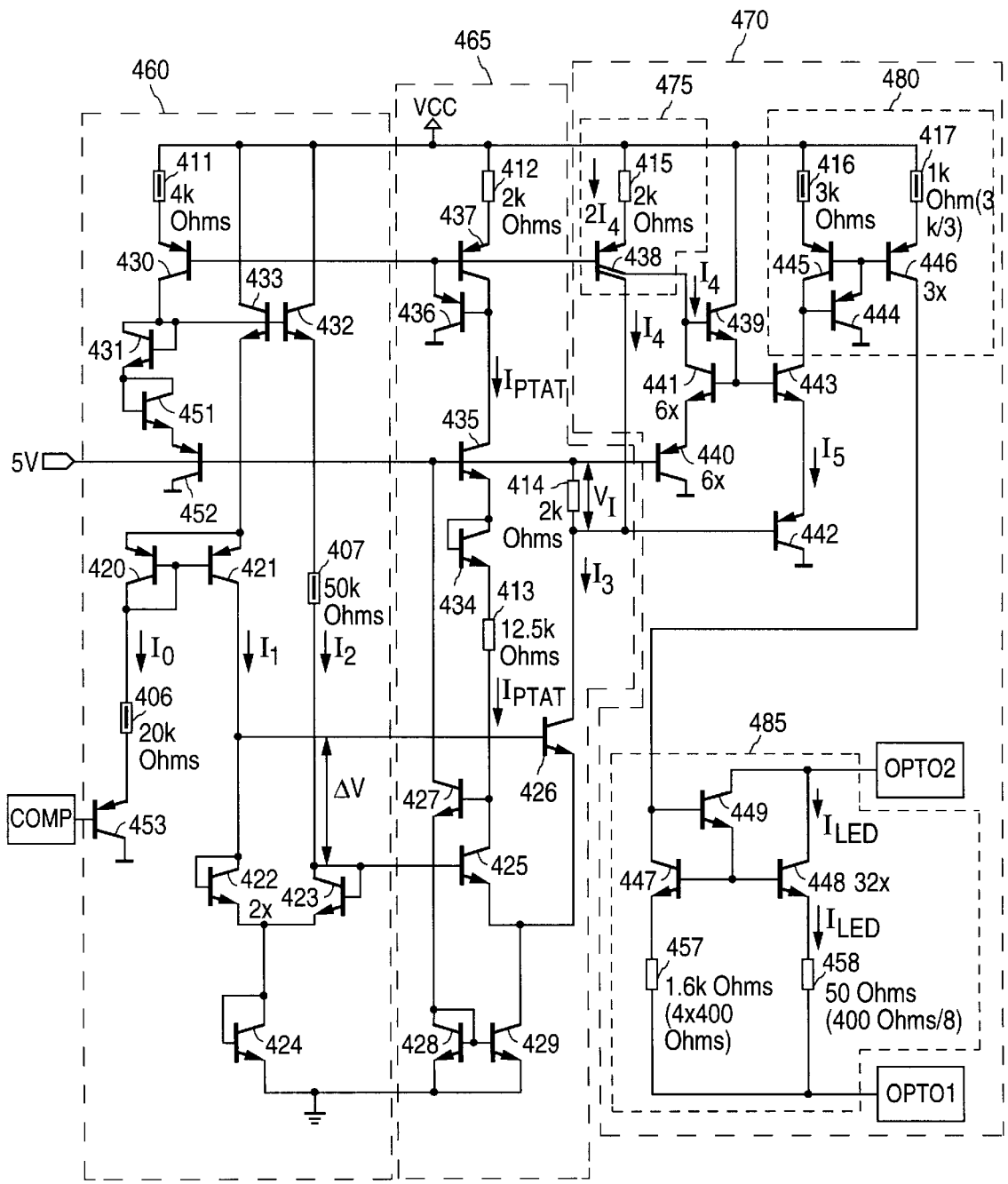
FIG. 4 is a circuit diagram of an embodiment of the exponential transconductance stage of an optocoupler LED drive circuit according to the present invention.

FIG. 4 shows a detailed circuit diagram of the exponential transconductance stage 316 of FIG. 3. The circuit shown in FIG. 4 comprises a differential voltage generation circuit 460, a differential input voltage generation circuit 465 and an exponential temperature independent current generation circuit 470.

Differential voltage generation circuit 460 has inputs at the 5V pin and the COMP pin, which are for inputting a 5 volt reference voltage and $V_C$, the output of the amplifier stage 314 in FIG. 3, respectively. $V_C$ is also herein referred to as $V_{COMP}$. Differential voltage generation circuit 460 outputs a voltage $\Delta V$, which is the voltage differential across the collector terminals of transistors 422 and 423. It is to be noted that in both transistors 422 and 423, the base and collector terminals have been connected. Thus, transistors 422 and 423 effectively act as pn junction diodes from the base to the emitter.

Transistor 430 in conjunction with resistor 411, which is preferably a 4 kOhm resistor, acts as a current source. The current from transistor 430 passes through transistors 431 and 451, which act as pn junction diodes, as each of these transistors has its base connected to its collector, to transistor 452. The 5V pin is coupled to the base of transistor 452. Therefore, the base of transistor 452 is at 5 volts. The voltage at the base of transistor 431 is 3 $V_{DR}$'s, where $V_{DR}$ is the voltage drop across a pn junction diode, above the voltage at the base of transistor 452, since there are three diodes 452, 451 and 431 from the base of transistor 452 to the base of transistor 431. The base of transistor 431 is coupled to the base of transistor 433. Therefore, the base of transistor 433 is also at 5 volts plus 3 $V_{DR}$'s. The voltage at the emitter of transistor 433 is 5 volts plus 2 $V_{DR}$'s as there is a drop of one $V_{DR}$ from the base to the emitter of transistor 433. The emitter of transistor 433 is coupled to the emitter of transistor 420. Therefore, the emitter of transistor 420 is also at 5 volts plus 2 $V_{DR}$'s. The voltage at the collector of transistor 420 is 5 volts plus one $V_{DR}$ while the voltage at the emitter of transistor 453 is $V_{COMP}$ plus one $V_{DR}$. Therefore, the voltage across resistor 406, which is coupled between the collector of transistor 420 and the emitter of transistor 453, is equal to 5 volts minus $V_{COMP}$. The difference between 5 volts and $V_{COMP}$ is herein referred to as $V_E$.

The current $I_O$ through resistor 406 is equal to $(V_E)/R_{406}$, where $R_{406}$ represents the resistance of resistor 406 and is preferably 20 kOhms. As transistors 420 and 421 are coupled in a current mirror configuration, $I_1$, the collector current of transistor 421, is substantially equal to $I_O$, the collector current of transistor 420.

By a similar derivation process, it is determined that the voltage drop across resistor 407 is equal to 5 volts, i.e., the input voltage at the 5V pin. Therefore, $I_2$, the current through resistor 407 is equal to 5 volts/$R_{407}$, where $R_{407}$ represents the resistance of resistor 407 and is preferably 50 kOhms.

The voltage differential, $\Delta V$ between the collectors of transistors 422 and 423 is given by the following equation:

$$\Delta V = V_T \ln\left(\frac{I_1}{I_2} \frac{A_{Q422}}{A_{Q421}}\right) \tag{2}$$

where $A_{Q421}$ and $A_{Q422}$ represent the base-emitter semiconductor junction areas of transistors 421 and 422, respectively, which, in the configuration shown in FIG. 4, act as pn-junction diodes, and $$V_T = \frac{kT}{q} \tag{3}$$

where k is the Boltzmann constant, T is the absolute temperature of the device in degrees Kelvin, and q is the electron charge.

The voltage $\Delta V$ is input to differential input voltage generation circuit 465. More specifically, voltage $\Delta V$ is applied across the base terminals of transistors 425 and 426.

Transistors 436 and 437, in conjunction with resistor 412, which preferably has a resistance of 2 kOhms, act as a current source generating current $I_{PTAT}$, where PTAT stands for proportional to absolute temperature. The voltage across resistor 413 is (5 volts–$4V_{DR}$)/$R_{413}$, where $R_{413}$ is the resistance of resistor 413 and is preferably 12.5 kOhms. As the voltage (5 volts–$4V_D$) is almost precisely proportional to the absolute temperature T of the exponential transconductance circuit shown in FIG. 4, (5 volts–$4V_{DR}$) is approximately equal to $mV_T$, where in is approximately equal to 90. Thus the voltage across resistor 413 is approximately equal to $mV_T$. The current through resistor 413 is $I_{PTAT}$. Thus, $$I_{PTAT} = \frac{mV_T}{R_{413}} \tag{4}$$

The voltage across resistor 414 has been defined as $V_O$, while the current through resistor 414 has been defined as $I_3$. The resistance of resistor 414 is $R_{414}$ and is preferably 2 kOhms.

As $\Delta V$ is the differential voltage input to transistors 425 and 426 the following relationship exists between $\Delta V$ and the other variables defined for differential input voltage circuit 465:

$$\Delta V = V_T \ln\left(\frac{I_3}{I_{PTAT}} \frac{A_{Q425}}{A_{Q426}}\right) \tag{5}$$

where $A_{Q425}$ and $A_{Q426}$ represent the base-emitter semiconductor junction areas of transistors 425 and 426, respectively.

Using equation (2) and (5), the following relationship is derived:

$$I_3 = (I_{PTAT})\left(\frac{I_1}{I_2}\right)\left(\frac{A_{Q422}}{A_{Q421}} \frac{A_{Q426}}{A_{Q452}}\right) \tag{6}$$

Given that $$I_{PTAT} = \frac{mV_T}{R_{413}} \tag{7}$$

equation (6) may be rewritten as follows:

$$I_3 = \left(\frac{mV_T}{R_{413}}\right)\left(\frac{I_1}{I_2}\right)\left(\frac{A_{Q422}}{A_{Q421}} \frac{A_{Q426}}{A_{Q425}}\right) \tag{8}$$

Given that $$I_1 = \frac{V_E}{R_{406}} \tag{9}$$

$$I_2 = \frac{5 \text{ volts}}{R_{407}} \tag{10}$$

$$I_3 = \frac{V_I}{R_{414}} \tag{11}$$

equation (8) may be rewritten as follows:

$$V_I = (mV_T)\left(\frac{V_E}{5 \text{ volts}}\right)\left(\frac{R_{414}}{R_{413}}\right)\left(\frac{R_{407}}{R_{406}}\right)\left(\frac{A_{Q422}}{A_{Q421}}\right)\left(\frac{A_{Q426}}{A_{Q425}}\right) \tag{12}$$

The constant terms in equation (12) may be combined together as constant K such that $$V_I = K V_E V_T \tag{13}$$

where $$K = \left(\frac{m}{5 \text{ volts}}\right)\left(\frac{R_{414}}{R_{413}}\right)\left(\frac{R_{407}}{R_{406}}\right)\left(\frac{A_{Q422}}{A_{Q421}}\right)\left(\frac{A_{Q426}}{A_{Q425}}\right) \tag{14}$$

The voltage $V_I$ is coupled to exponential temperature independent current generation circuit 470. Exponential temperature independent current generation circuit 470 includes current source 475, transistors 439, 440, 441, 442 and 443, and current multipliers 480 and 485. Current source 475 generates a current $2I_4$ which is split into currents $I_4$ by transistor 438, which is equivalent to two matched transistors whose respective bases and emitters are at the same potential. Current source 475 includes transistor 438 and resistor 415, which is coupled between $V_{CC}$ and the emitter of transistor 438. Current $2I_4$ is equal to current $I_{PTAT}$ since transistors 437 and 438 are in a current mirror arrangement. Therefore, current $I_4$ is equal to one half of current $I_{PTAT}$. As shown in equation (7), current $I_{PTAT}$ is equal to $mV_T/R_{413}$. $R_{413}$ has a temperature dependence that is similar to the temperature dependence of $V_T$. As a result, current $I_{PTAT}$ is temperature independent. Accordingly, current $I_4$ is also temperature independent.

Current multiplier 480 includes transistors 444, 445 and 446, and resistors 416 and 417, which are coupled to $V_{CC}$ and the emitters of transistors 445 and 446, respectively. The emitter of transistor 444 is coupled to the bases of transistors 445 and 446, while its collector is coupled to ground and its base is coupled to the collector of transistor 445. In a preferred embodiment, the resistances of resistors 416 and 417 are 3 kOhms and 1 kOhm, respectively, and transistor 446 has an effective emitter area that is three times as large as that of transistor 445 such that the current through transistor 446 is three times as large as the current through transistor 445. Those skilled in the art will recognize current multiplier 480 as a current mirror with the current through resistor 417 and transistor 446 three times as large as the current through resistor 416 and transistor 445. In one embodiment, transistor 446 comprises three transistors coupled in parallel, where each of the three transistors has an emitter area equal to that of transistor 445.

Similarly, current multiplier 485 includes transistors 447, 448, and 449, and resistors 457 and 458, which are coupled to the emitters of transistors 447 and 448, respectively, and to the pin OPTO 1. The base of transistor 449 is coupled to the collector of transistor 447, while its emitter is coupled to the bases of transistors 447 and 448 and its collector is coupled to the pin OPTO 2. In a preferred embodiment, the resistances of resistors 457 and 458 are 1.6 kohms and 50 ohms, respectively, and transistor 448 has an effective emitter area that is thirty-two times as large as that of transistor 447 such that the current through transistor 448 is 32 times as large as the current through transistor 447. Those skilled in the art will recognize current multiplier 485 as a current mirror with the current through transistor 448 and resistor 458 thirty-two times as large as the current through transistor 447 and resistor 457. In one embodiment, transistor 448 comprises thirty-two transistors coupled in parallel, where each of the thirty-two transistors has an emitter area equal to that of transistor 447. Also in one embodiment, OPTO 2 is coupled to the cathode terminal of LED 308 (shown in FIG. 3) while OPTO 1 is coupled to ground. In another embodiment, the anode terminal of LED 308 is coupled to OPTO 1 while OPTO 2 is coupled to the output voltage.

The voltage $V_I$ is input across the bases of transistors 440 and 442.

$$V_I = \Delta V_{BE}(422, 440) + \Delta V_{BE}(443, 441) \quad (15)$$

$$V_I = V_T \ln\left(\frac{I_5}{I_4}\frac{A_{Q440}}{A_{Q442}}\right) + V_T \ln\left(\frac{I_5}{I_4}\frac{A_{Q441}}{A_{Q443}}\right) \quad (16)$$

where $I_5$ is the current through transistors 443 and 442, $I_4$ is the current through transistors 441 and 440, and $A_{Q440}$, $A_{Q441}$, $A_{Q442}$ and $A_{Q443}$ are the base-emitter semiconductor junction areas of transistors 440, 441, 442 and 443, respectively.

Equation 16 may be rearranged as follows:

$$V_I = V_T \ln\left(\frac{I_5}{I_4}\right)^2 \left(\frac{A_{Q440}}{A_{Q442}}\right)\left(\frac{A_{Q441}}{A_{Q443}}\right) \quad (17)$$

Using equations (13) and (17), the following relationship is derived between currents $I_5$ and $I_4$:

$$I_5 = I_4 \sqrt{\frac{A_{Q442} A_{Q443}}{A_{Q440} A_{Q441}}} \, e^{\frac{KV_E}{2}} \quad (18)$$

The current $I_5$ is amplified by current multipliers 480 and 485. The amplified current is the driving current $I_{LED}$ of LED 308.

$$I_{LED} = H_1 H_2 I_5 = H_1 H_2 I_4 \sqrt{\frac{A_{Q442} A_{Q443}}{A_{Q440} A_{Q441}}} \, e^{\frac{KV_E}{2}} \quad (19)$$

where $H_1$ and $H_2$ are the current gains of current multipliers 480 and 485, respectively. In a preferred embodiment, current gains $H_1$ and $H_2$ are 3 and 32, respectively. However, it is to be noted that other gains may also be used for both $H_1$ and $H_2$. Linear current gains $H_1$ and $H_2$ allow the exponential core, i.e., transistors 440, 441, 442 and 443, to operate at low currents where exponential behavior is good, as they amplify the current $I_{LED}$ to the necessary level.

It is to be noted that $I_{LED}$ is independent of the temperature of the devices in circuit 400 and the temperature of the optocoupler. Therefore, circuit 400 provides an output current for driving LED 308 that is independent of temperature. It is also to be noted that $I_{LED}$ is exponentially related to $V_E$, which is a function of the output voltage $V_O$. Such an exponential relation is preferred because it provides a small signal gain in $I_{LED}$ per an incremental change in $V_E$ that is proportional to the operating point of $I_{LED}$. This is due to the nature of the exponential function, because as is well known, if $$I_{LED} = C_1 e^{C_2 V_E} \quad (20)$$

where $C_1$ and $C_2$ are constants, then $$\frac{d I_{LED}}{d V_E} = C_2 I_{LED} \quad (21)$$

As $V_E = 5$ volts$-V_{COMP}$, an incremental change in $V_E$ results in an incremental change $V_{COMP}$. Therefore, the incremental small signal gain in $I_{LED}$ per an incremental small signal gain in $V_E$ (or $V_{Comp}$) is proportional to the operating (DC bias point) of $I_{LED}$.

It is to be noted that other non-linear functions, in addition to the exponential function, may provide a similar functionality. In other words, they may provide an incremental increase in the current $I_{LED}$ per incremental change in the input voltage to the non-linear transconductance circuit such that the incremental gain in $I_{LED}$ is proportional to $I_{LED}$. For example, a polynomial function of the current $I_{LED}$, such as, for example, a square or cube power thereof, may provide such a functionality. In one implementation of such a scheme, the operating point of the LED may be detected and its digitally controlled gain adjusted to compensate for changes in the operating point such that the gain is proportional to the operating point.

It is also to be noted that the exponential transconductance circuit of FIG. 4, and more specifically differential voltage generation circuit 460 of FIG. 4, comprises a voltage to current transconductance circuit. The voltage to current transconductance circuit comprises transistors 420, 421, and 453, and resistor 406. The input to the voltage to current transconductance circuit is the voltage input at pin COMP, while its output current is $I_1$. The exponential transconductance circuit of FIG. 4 also comprises a temperature dependent current multiplier circuit for adjusting current $I_1$, and for producing a current output that is temperature dependent. The temperature dependent current multiplier circuit comprises transistors 422, 423, 424, 425, 426, 427, 428, 429, 434 and 435 and resistor 415. The input to the temperature dependent current multiplier circuit is the current $I_1$, while its output is the current $I_3$. As can be seen from equation (8), $I_3$ is a multiple of $I_1$. Moreover, $I_3$ is dependent on temperature, because $I_3$ is a function of $V_T$, which is in turn a function of the temperature T as can be seen in equation (3). The temperature dependent current multiplier circuit preferably amplifies the current $I_1$ into the current $I_3$, thus increasing the gain of the LED drive circuit of which it is a part. The temperature dependent current multiplier circuit also preferably compensates for the effects of temperature on current $I_1$ by generating the temperature dependent current $I_3$ in response to $I_1$. The exponential transconductance circuit of FIG. 4 also comprises a temperature dependent exponential gain circuit which in FIG. 4 is the exponential temperature independent current generation circuit 470. The temperature dependent exponential gain circuit is coupled to the temperature dependent current multiplier circuit. The voltage $V_I$ generated across resistor 414 by the temperature dependent current $I_3$ through resistor 414 is coupled to the temperature dependent exponential gain circuit. In response to the voltage $V_I$, which is temperature dependent, and the current $I_4$, the temperature dependent exponential gain circuit outputs a current $I_{LED}$, which is exponentially related to current $I_4$ and is temperature independent as can be seen in equation (19). This is why the temperature dependent exponential gain circuit is also referred to as the exponential temperature independent current generation circuit 470. As can also be seen in equation (19), the current $I_{LED}$ is an exponential function of the voltage $V_E$, which is in turn a function of current $I_1$, as it is equal to $(I_1)(R406)$. Therefore, the current $I_{LED}$ is an exponential function of current $I_1$. Moreover, as the voltage $V_E$ is a function of voltage $V_{COMP}$ which is in turn a function of the output voltage, the current $I_{LED}$ is also a function of the output voltage.

While the present invention has been particularly described with respect to the illustrated embodiments, it will be appreciated that various alterations, modifications and adaptations may be made based on the present disclosure, and are intended to be within the scope of the present invention. For example, although the present invention was developed to improve optocoupler response in a power supply, the present invention is generally applicable to any feedback loop with an element within the loop exhibiting unpredictable gain. This "gain" can be a transfer characteristic other than an electronic signalling means, e.g., flow rates of liquids, temperature, etc. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. In an electronic circuit having an input stage, an output stage having an output voltage, and a feedback element including a coupler having a transmitter coupled to said output stage and a receiver coupled to said input stage, said transmitter sending an output signal that is a function of said output voltage to said receiver, said receiver generating a receiver output in response to receiving said output signal, a feedback control circuit for said feedback element comprising:

a transmitter drive circuit coupled to said transmitter for adjusting said output signal as a function of said output voltage, said transmitter drive circuit comprising an error signal generation stage, said error signal generation stage generating a feedback control signal as a function of the output voltage, and a non-linear stage, said non-linear stage generating a transmitter drive signal and for coupling said transmitter drive signal to said transmitter as a function of said feedback control signal, wherein said non-linear stage non-linearly adjusts said transmitter drive signal to compensate for variations in the ratio of said receiver output to said transmitter drive signal; and a receiver output circuit for amplifying said receiver output, for coupling said amplified receiver output to said input stage, and for causing said receiver to operate at a substantially fixed bias operating current.

2. The feedback control circuit of claim 1, wherein said non-linear stage is an exponential gain stage and wherein said receiver is galvanically isolated from said transmitter.

3. The feedback control circuit of claim 2, wherein said transmitter drive circuit further comprises a drive circuit input stage for receiving said output voltage from said output stage and for outputting an input signal that is a function of said output voltage to said error signal generation stage.

4. The feedback control circuit of claim 3, wherein said drive circuit input stage comprises a voltage divider stage.

5. The feedback control circuit of claim 4, wherein said voltage divider stage comprises resistors for dividing said output voltage such that said input signal has a magnitude less than that of said output voltage.

6. The feedback control circuit of claim 1, wherein said non-linear stage is an exponential transconductance stage for exponentially adjusting the transmitter drive signal, said coupler comprising an optocoupler having a light emitting diode (LED) as said transmitter and a phototransistor as said receiver, said phototransistor optically coupled to said LED, said LED having an anode and a cathode and said phototransistor having an emitter terminal and a collector terminal.

7. The feedback control circuit of claim 6, wherein said transmitter drive circuit is an LED drive circuit coupled to said LED, wherein said transmitter drive signal is an LED drive current and said receiver output circuit is a phototransistor output circuit coupled to said emitter of said phototransistor.

8. The feedback control circuit of claim 7, wherein said exponential transconductance stage comprises:

means for converting said feedback control signal to a current control signal that is independent of temperature;

temperature dependent multiplier means for generating a temperature dependent current output as a function of said current control signal; and temperature dependent exponential gain means for generating said LED drive current whose value is independent of temperature and is an exponential function of the current control signal.

9. The feedback control circuit of claim 7, wherein said receiver output is the emitter current of said phototransistor and wherein said phototransistor output circuit comprises means for amplifying said emitter current and means for operating said phototransistor at said substantially fixed bias operating current and further wherein the gain of said means for amplifying is controlled independently of said means for operating said phototransistor.

10. The feedback control circuit of claim 9, wherein said means for amplifying comprises an amplifier and an amplifier gain element, said amplifier having inverting and non-inverting input terminals and an output terminal which is coupled to said input stage of said electronic circuit, wherein said inverting input terminal is coupled to said emitter of said phototransistor, said non-inverting input terminal is coupled to a reference voltage, and said amplifier gain element is coupled to said output terminal and to said inverting input terminal.

11. The feedback control circuit of claim 10, wherein said amplifier gain element is a resistor.

12. The feedback control circuit of claim 11, wherein said means for operating said phototransistor comprises a resistor coupled between said emitter of said phototransistor and ground.

13. In an electronic circuit having an input stage and an output stage having an output voltage, a feedback element positioned between the output stage and the input stage, said feedback element comprising:
    an optocoupler having a light emitting diode (LED) optically coupled to a phototransistor, said LED having an anode and a cathode and said phototransistor having an emitter terminal and a collector terminal, wherein said LED is coupled to said output stage and said phototransistor is coupled to said input stage, further wherein the gain of said optocoupler is the ratio of the emitter current of said phototransistor to the current through said LED;
    an LED drive circuit coupled to said LED and comprising a drive circuit input stage for receiving said output voltage, said drive circuit input stage providing an input signal that is a function of said output voltage, an error signal generation stage coupled to said drive circuit input stage for generating a feedback control signal that is a function of said input signal, and an exponential stage coupled to said error signal generation stage for generating an LED drive signal and for coupling said LED drive signal to said LED, wherein said exponential stage exponentially adjusts said LED drive signal as a function of said feedback control signal to compensate for variations in the gain of said optocoupler; and
    a phototransistor output circuit coupled to said emitter of said phototransistor and the input stage, said phototransistor output circuit receiving and amplifying the emitter current and coupling the amplified emitter current to said input stage, wherein said phototransistor output circuit causes said phototransistor to operate at a predetermined and substantially fixed direct current bias operating current.

14. The feedback element of claim 13 wherein said exponential stage comprises an exponential transconductance stage.

15. A power converter comprising:
    input nodes;
    output nodes for coupling to a load;
    a primary stage coupled to said input nodes, said primary stage comprising:
        a primary winding of a transformer wherein a first terminal of said primary winding is coupled to one of said input nodes;
        a power switch having an ON state and an OFF state and corresponding ON and OFF periods, said power switch coupled to a second terminal of said primary winding and to a second one of said input nodes;
        a controller coupled to said power switch for controlling the length of the ON and OFF periods of said power switch;
        a phototransistor of an optocoupler, said phototransistor providing an output current signal; and
        a phototransistor output circuit coupled to said phototransistor and said controller for amplifying the output current signal of said phototransistor and operating said phototransistor at a predetermined and substantially fixed bias operating current;
    a secondary stage coupled to said output nodes, said secondary stage being galvanically isolated from said primary stage and comprising:
        a secondary winding of said transformer, a first terminal of said secondary winding coupled to one of said output nodes;
        an LED of said optocoupler coupled to a second terminal of said secondary winding; and
        an LED drive circuit coupled to said LED, said second terminal of said secondary winding and said output nodes, said LED drive circuit comprising:
            a drive circuit input stage coupled to said output nodes, said drive circuit input stage for receiving an output voltage at said output nodes and for providing an input signal that is a function of said output voltage;
            an error signal generation stage coupled to said drive circuit input stage for generating a feedback control signal that is function of said input signal; and
            an exponential stage coupled to said error signal generation stage and said LED, said exponential stage for generating an LED drive signal and for coupling said LED drive signal to said LED, wherein said exponential stage exponentially adjusts said LED drive signal as a function of said feedback control signal to compensate for variations in the ratio of the output current signal of said phototransistor to the LED drive signal.

16. The power converter circuit of claim 15 wherein said exponential stage comprises an exponential transconductance stage.

17. A feedback loop having an input stage, an output stage, and a feedback element including a variable gain coupler having a transmitter coupled to said output stage and a receiver coupled to said input stage, said transmitter sending an output signal to said receiver, said receiver generating a receiver output for said input stage in response to receiving said output signal, a feedback control circuit for said feedback element, said feedback control circuit comprising:
    a transmitter drive circuit coupled to said transmitter for adjusting said output signal, said transmitter drive circuit comprising an error signal generation stage, said error signal generation stage generating a feedback control signal as a function of the output signal, and an exponential gain stage, said exponential gain stage generating a transmitter drive signal and for coupling said transistor drive signal to said transmitter as a function of said feedback control signal, wherein said exponential gain stage non-linearly adjusts said transmitter drive signal to compensate for variations in the ratio of said receiver output to said transmitter drive signal.

* * * * *